Feb. 16, 1960   R. B. COLTEN ET AL   2,924,968
PRESS LOAD MEASURING APPARATUS
Filed Jan. 27, 1958   5 Sheets-Sheet 1

INVENTORS
Robert B. Colten,
Ralph R. Sylvester &
Robert G. Pfetsch
BY E. W. Christen
ATTORNEY

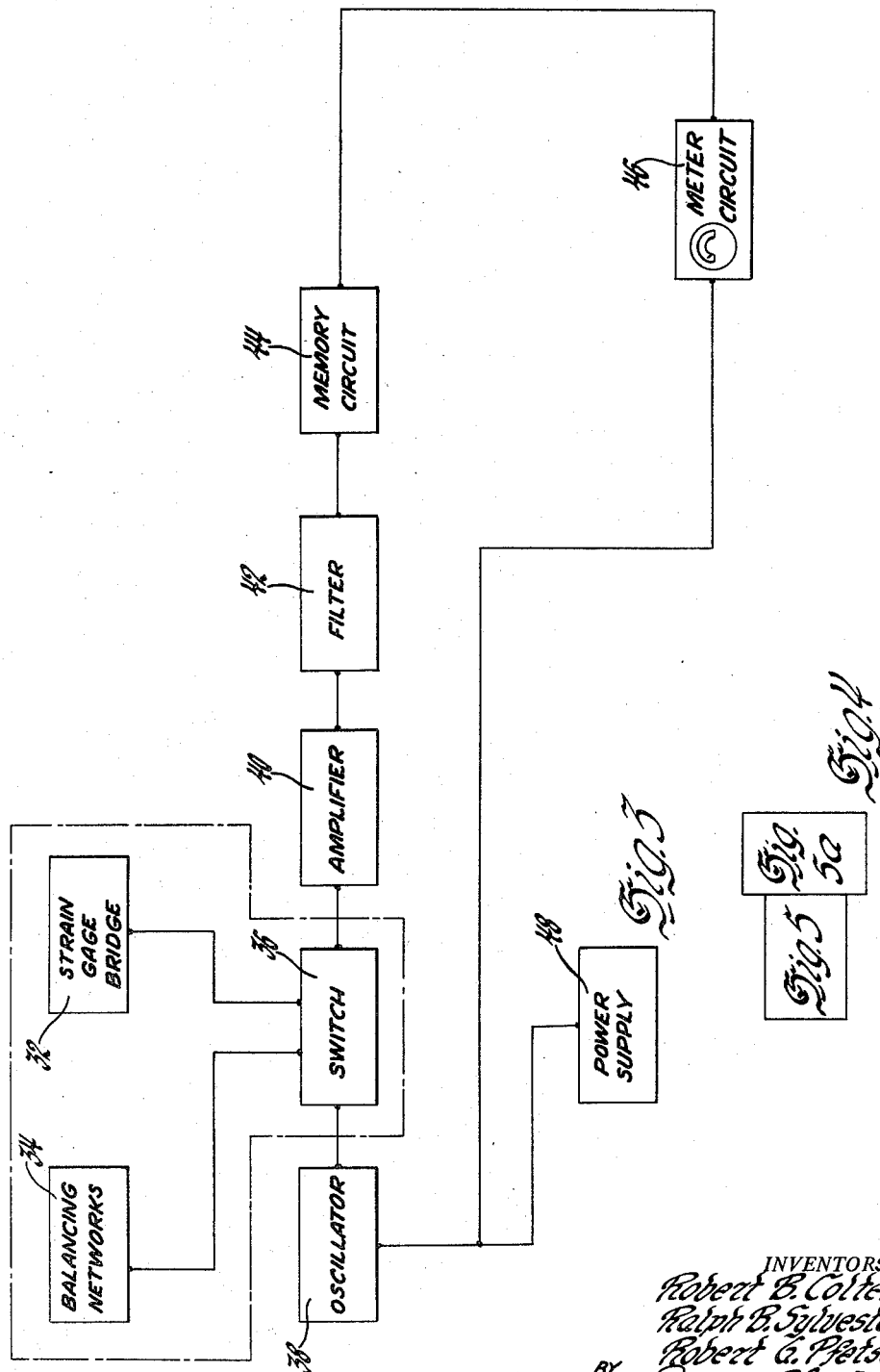

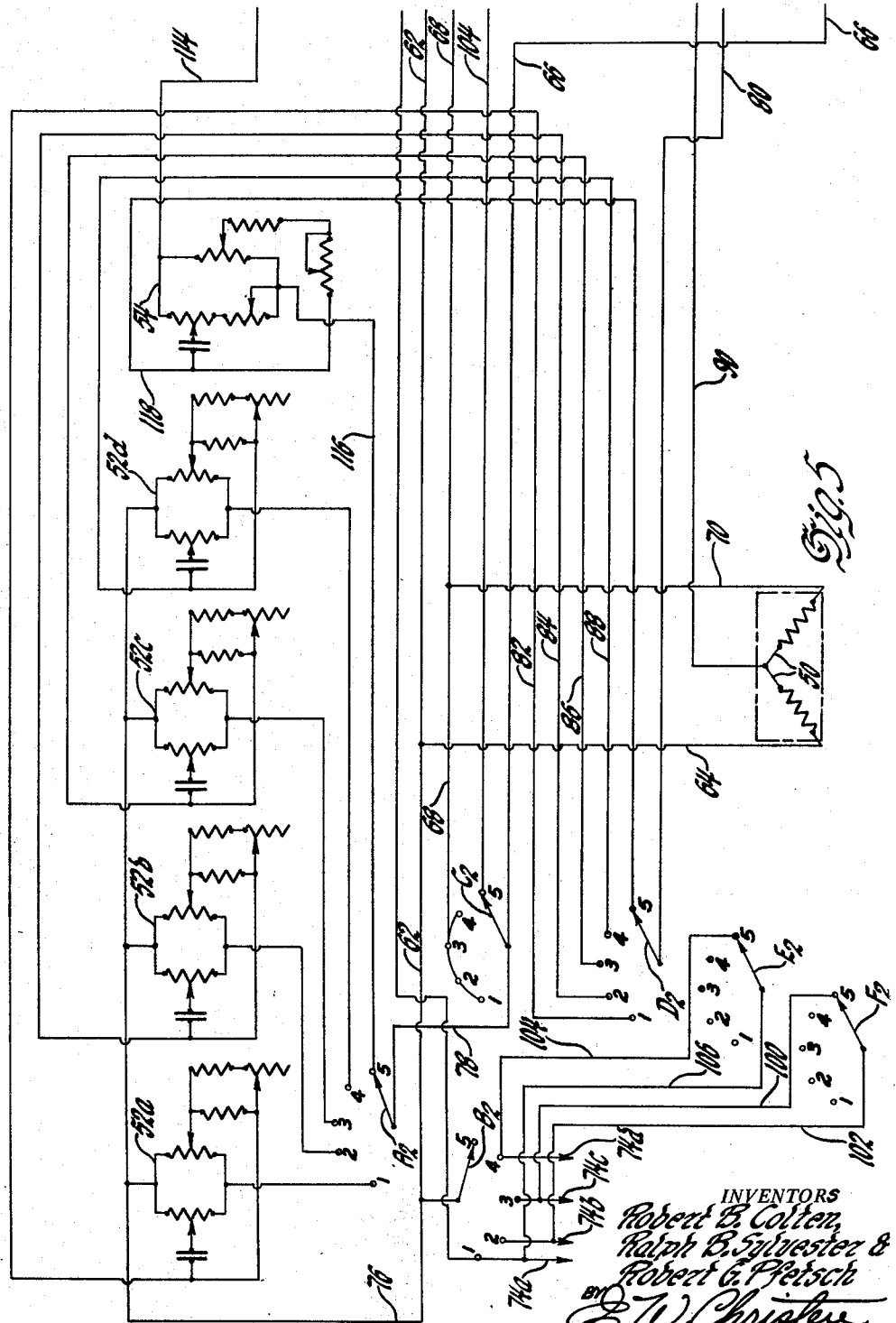

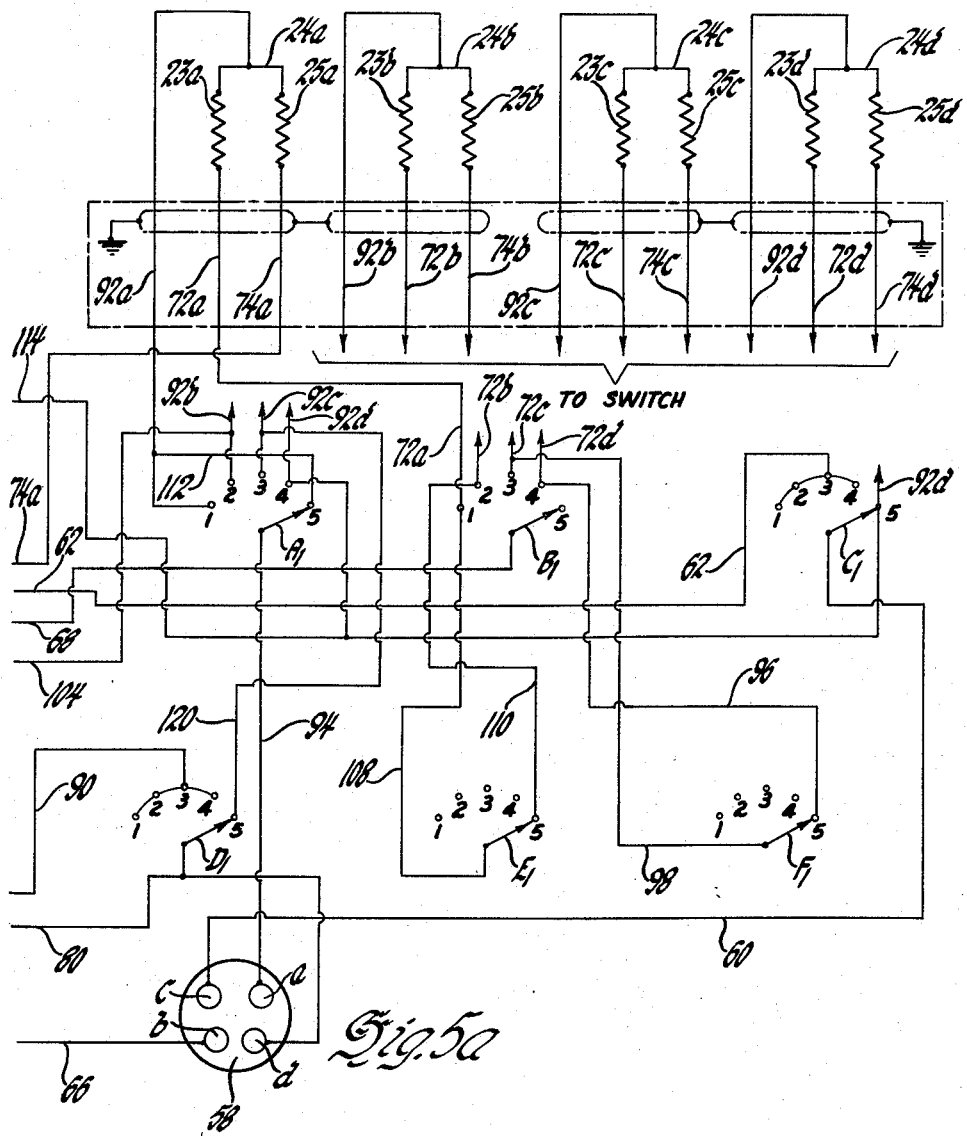

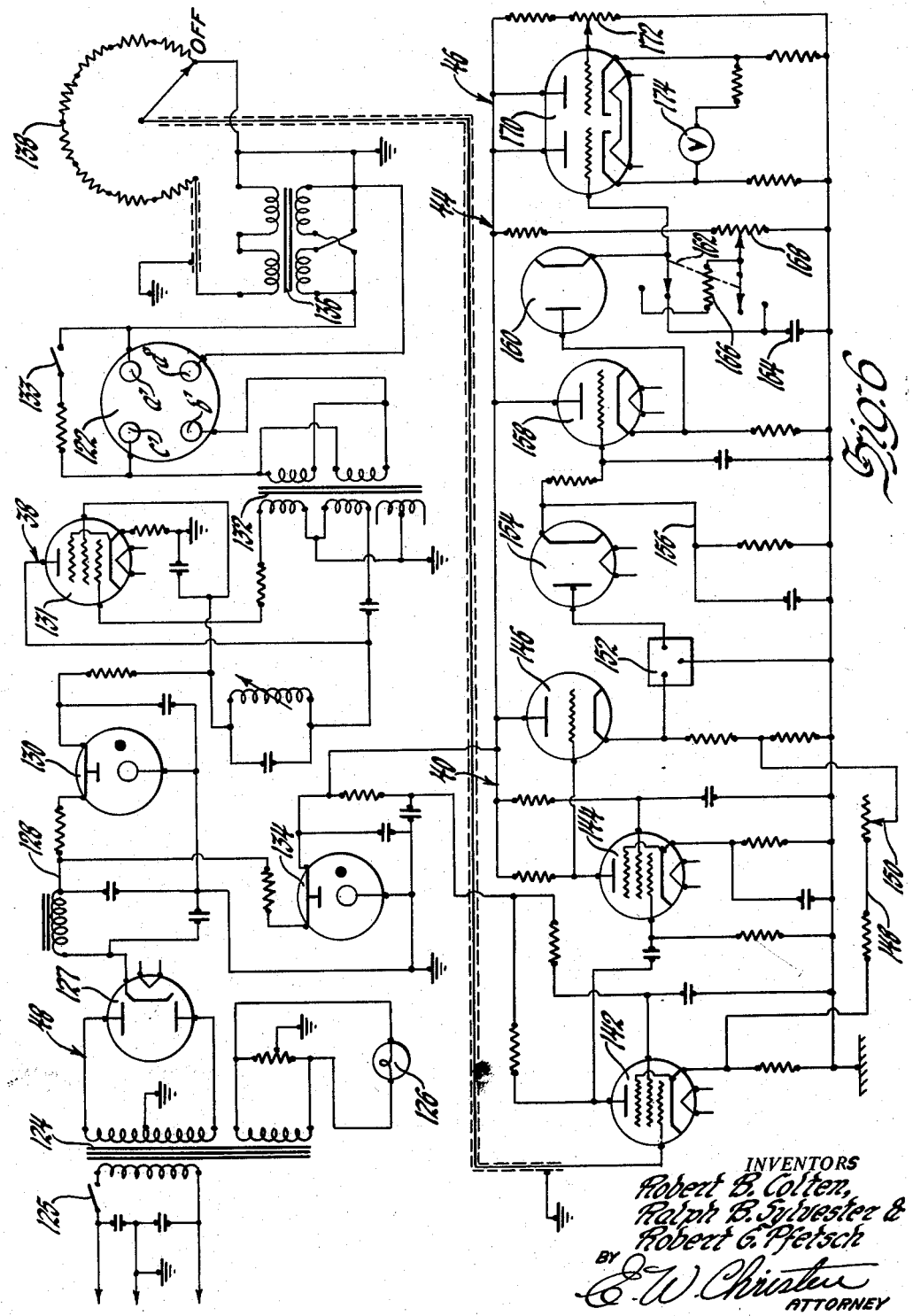

United States Patent Office 2,924,968
Patented Feb. 16, 1960

2,924,968

PRESS LOAD MEASURING APPARATUS

Robert B. Colten, Oak Park, Ralph B. Sylvester, St. Clair Shores, and Robert G. Pfetsch, Detroit, Mich., assignors to General Motors Corporation, Detroit, Mich., a corporation of Delaware Application January 27, 1958, Serial No. 711,477

6 Claims. (Cl. 73—88.5)

This invention relates to measuring apparatus and more particularly to such apparatus for measuring and indicating the stress or load on structural members of industrial presses and the like.

In such presses it is desirable, for most effective operation, to provide information regarding the load imposed on the various press members under different conditions of operation. Such load information is valuable in setting up a production press for proper load distribution and for reducing die setup time. It is also valuable in press operation for determining an overload condition or the extent of die wear so that breakage and scrap may be minimized. In die tryout presses such information is useful for determining the tonnage necessary for a particular die.

In accordance with this invention, this information is developed by a measuring circuit including a system of electrical strain gages in a transducer unit. It is, of course, desired to obtain the load information without requiring costly shut-down periods of the press. Accordingly, the transducer unit, which includes the strain gages together with balancing and switching circuits, is installed on the press as a fixed accessory to permit measurements under any conditions without interference with the press operation. For use with several presses, a portable indicating unit is adapted to coact with the several transducer units. An important feature of this invention is the provision, in the transducer unit, for measuring the load on any one selected member and for totalizing the individual loads on plural members. A feature of the indicating unit is a memory circuit to permit the sustained indication of fast acting dynamic loads. Other features of the press load measuring apparatus will become apparent as the description proceeds.

A more complete understanding of this invention may be had from the detailed description which follows taken with the accompanying drawings in which:

Figure 3 is a block diagram representing the electrical circuits of the press load measuring apparatus;

Figure 4 illustrates the orientation of Figures 5 and 5a of the drawings in which Figure 5a is a continuation of Figure 5;

Figures 5 and 5a represent a schematic diagram of the circuits of the transducer unit; and Figure 6 is a schematic diagram of the circuits of the indicating unit.

Figure 1:
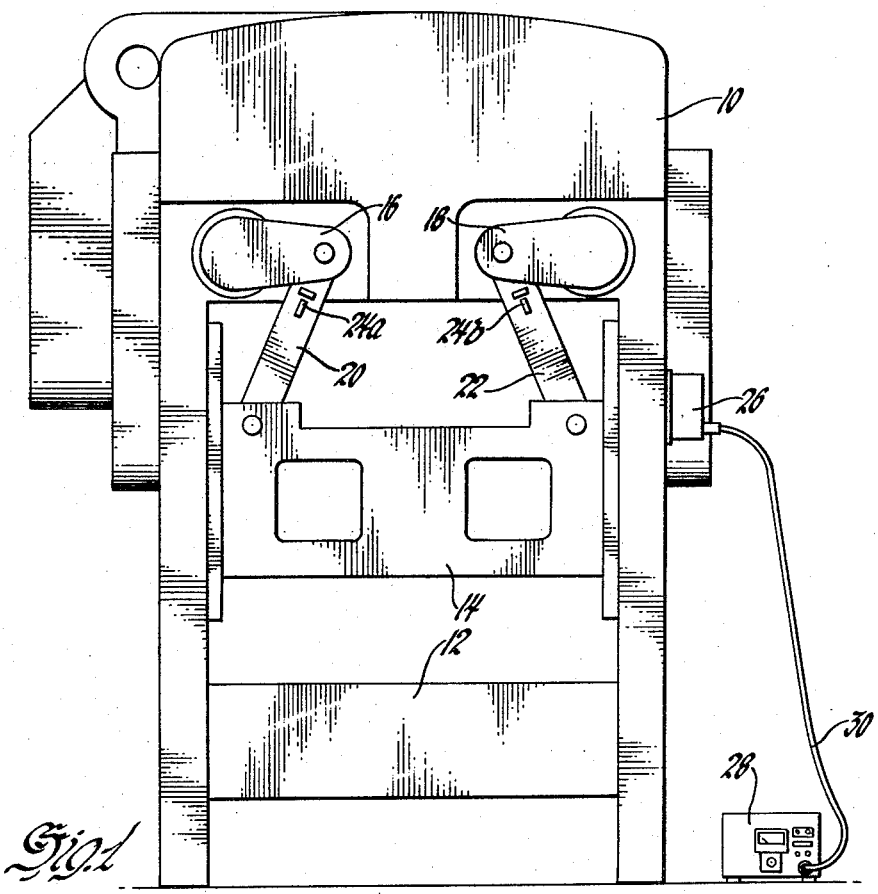
Figure 1 illustrates a typical installation of the press load measuring apparatus.

Referring now to the drawings, there is shown an illustrative embodiment of the press load measuring apparatus in a double acting toggle press 10 having a fixed member or platen 12 and a movable member or platen 14 adapted to receive forming dies in a well known manner. The movable platen 14 is actuated in a vertical slideway by the front toggle linkages 16 and 18 including load-carrying rods 20 and 22, respectively, and by a similar pair of rear toggle linkages not shown. For sensing the load imposed upon the rods 20 and 22 the strain gage bridge sensing arms 24a and 24b, respectively, are mounted thereon and corresponding sensing arms are mounted upon the rods of the rear toggle linkages. The sensing arms are interconnected with and form a part of the transducer unit 26 which is mounted upon the side of the press 10 as a fixed accessory. The transducer unit 26 is interconnected with the portable indicator unit 28 by the electrical cable 30.

Referring now to the block diagram of Figure 3, a strain gage bridge 32 is interconnected with a balancing network 34 through a selector switch 36. The strain gage bridge is excited from an oscillator 38 through switch 36 and the signal voltage developed thereby is applied to an amplifier 40 and thence through a filter circuit 42 to a memory circuit 44. The memory circuit 44 permits either a momentary or sustained signal voltage to be applied to a meter circuit 46. The electrical circuits just described are energized from a suitable power supply 48.

Figure 2:
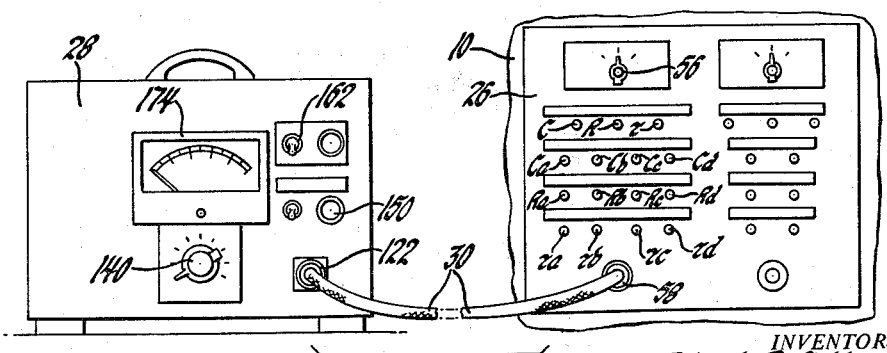
Figure 2 shows a transducer unit together with a portable indicating unit.

Referring now to Figures 5 and 5a, the circuits of the transducer unit 26, including the strain gage bridge, balancing and switching circuits will be described. This illustrative circuit provides four channels for selective measurements of individual loads and the total load, although it will be apparent that a different number of channels may be provided. The front panel of the transducer unit 26, as shown in Figure 2, is adapted to accommodate also a two channel arrangement. Consider first the strain gage bridge circuits, which are suitably formed of resistance strain gage elements such as those designated SR–4 and manufactured by the Baldwin-Lima-Hamilton Corporation. For each individual load measurement, a selected pair of sensing arms 24a, 24b, 24c or 24d are connected in a Wheatstone bridge circuit and include one active strain gage element 23a, 23b, 23c or 23d mounted upon a selected load-carrying member in a well known manner to be subjected to deformation corresponding to that of the load-carrying member. A passive strain gage element 25a, 25b, 25c or 25d is mounted upon the same member in a manner to be non-responsive to the deformation thereof and is connected with the corresponding active element to form one pair of conjugate arms of the bridge circuit and provide temperature compensation for the active element. For measuring the load on an individual member, a common pair of dummy arms 50 is used with any selected one of the sensing arms in the bridge circuit and includes a pair of dummy elements which are located on the chassis of the transducer unit 26. For measuring the total load on the press or on selected plural members, all of the sensing arms 24a, 24b, 24c and 24d are connected in a bridge circuit with the active elements in one pair of opposite arms and the passive elements in the other pair of opposite arms while the dummy arms 50 are not used.

Each different bridge circuit requires individual balancing and, for this purpose, separate balancing circuits are provided. The balancing circuits 52a, 52b, 52c and 52d are associated respectively with the sensing arms 24a, 24b, 24c and 24d. Additionally, for total load measurement, the balancing circuit 54 is provided. To adapt the transducer unit 26 to the particular press 10 each of the balancing circuits is provided with adjustable balance controls. For the balancing circuit 54 a capacitance adjustment element C, a coarse resistance adjustment element R, and a fine resistance adjustment element $r$ are accessible on the front panel of transducer unit 26. Each of the balancing circuits 52a, 52b, 52c and 52d is provided respectively with a capacitance adjustment element $C_a$, $C_b$, $C_c$, and $C_d$; a coarse resistance adjustment element $R_a$, $R_b$, $R_c$, $R_d$; and a fine resistance adjustment element $r_a$, $r_b$, $r_c$ and $r_d$ which are also accessible on the front panel of transducer unit 26.

To afford manual selection of the desired load measurement, the transducer unit 26 is provided with a switching circuit for interconnecting the proper sensing and dummy arms with the associated balancing circuit. The switching circuit comprises a switch having multiple poles $A_1$, $A_2$, $B_1$, $B_2$, $C_1$, $C_2$, $D_1$, $D_2$, $E_1$, $E_2$, $F_1$ and $F_2$ each having positions 1 through 5 as indicated of the movable contacts which are displaced concurrently by manual selector knob 56 on the front panel of transducer unit 26. The switching circuit will be described presently by tracing the circuits from the input terminals to the output terminals of the transducer unit 26 for various conditions of load measurement selection.

The transducer unit 26 is provided with a receptacle 58 having input terminals $b$ and $c$ and output terminals $a$ and $d$. The input terminals are supplied with an excitation voltage, in a manner to be described subsequently. To enable individual load measurements to be taken with the selector switch knob 56 in any one of its first four positions, the input terminal $c$ is connected through conductor 60 to the movable contact of switch pole $C_1$ and thence through fixed contacts 1, 2, 3, or 4 and conductors 62 and 64 to one end terminal of the dummy arms 50. Similarly, input terminal $b$ is connected through conductor 66 to the movable contact of switch pole $C_2$ and thence from fixed contacts 1, 2, 3, or 4 through conductors 68 and 70 to the other end terminal of the dummy arms 50. Since the fixed contacts 1, 2, 3, and 4 are connected together in both switch poles $C_1$ and $C_2$, an excitation circuit for the dummy arms 50 is established for any one of the first four switch positions. For the selective connection of the sensing arms 24a, 24b, 24c and 24d across the dummy arms 50, the switch poles $B_1$ and $B_2$ are used. Switch pole $B_1$ has its movable contact connected through conductors 68 and 70 to one end terminal of dummy arms 50 and switch pole $B_2$ has its movable contact connected through conductors 62 and 64 to the other end terminal thereof. The sensing arms 24a, 24b, 24c and 24d have their end terminals connected respectively through conductors 72a, 72b, 72c and 72d to fixed contacts 1, 2, 3 and 4 of switch pole $B_1$ and through conductors 74a, 74b, 74c and 74d to fixed contacts 1, 2, 3, and 4 of switch pole $B_2$. It is thus apparent that the selector switch, in positions 1, 2, 3 and 4, respectively, connects the sensing arms 24a, 24b, 24c and 24d across the dummy arms 50 and across the input terminals $b$ and $c$ to form successively, four different bridge circuits. In the same sequence the switch poles $C_1$, $A_2$ and $D_2$ connect the balancing circuits 52a, 52b, 52c and 52d between the input terminals $b$ and $c$ and to the output terminal $d$ for balancing adjustment of the respective bridge circuits. This is accomplished by connection of conductor 62, from switch pole $C_1$, through a conductor 76 to the common upper terminals of the balancing circuits 52a, 52b, 52c and 52d and connection of the movable contact of switch pole $C_2$ through a conductor 78 to the movable contact of switch pole $A_2$, the fixed contacts 1, 2, 3 and 4 of which are connected respectively to the individual lower terminals of the balancing circuits 52a, 52b, 52c and 52d. The balancing circuit connections are completed by connecting the output terminal $d$ through conductor 80 to the movable contact of switch pole $D_2$ and thence from the fixed contacts 1, 2, 3 or 4 through conductors 82, 84, 86 or 88, respectively, to the remaining terminals of the balancing circuits 52a, 52b, 52c or 52d, respectively.

With the successive bridge circuits for individual load measurements thus completed, the bridge circuit signal voltages are derived across the intermediate terminal of dummy arms 50 and the selected intermediate terminal of sensing arms 24a, 24b, 24c or 24d through switch poles $D_1$ and $A_1$. For this purpose, the intermediate terminal of dummy arms 50 is connected through conductor 90 to fixed contacts 1, 2, 3 and 4 of switch pole $D_1$ and thence from its movable contact through conductor 80 to output terminal $d$. The intermediate terminals of sensing arms 24a, 24b, 24c and 24d are connected respectively through conductors 92a, 92b, 92c and 92d to fixed contacts 1, 2, 3 and 4 of switch pole $A_1$ and thence from its movable contact through conductor 94 to output terminal $a$. Thus the selected bridge circuit signal voltages are developed across output terminals $a$ and $d$.

To enable a total load measurement to be taken, a bridge circuit is formed with the active elements 23c and 23d connected serially in one arm and the active elements 23a and 23b connected in the opposite arm. The bridge circuit is completed by connection of the passive elements 25b and 25c in another arm and the passive elements 25a and 25d in the opposite arm and thus the bridge signal voltage is the summation of the individual load measurements. With the selector switch in position 5 this arrangement of the bridge circuit elements is obtained by switch poles $C_1$, $C_2$, $F_1$, $F_2$, and $E_1$ and $E_2$. The circuit is completed between the input terminals $b$ and $c$ through one pair of conjugate arms of the bridge circuit. One arm extends from terminal $c$, through conductor 60 through switch pole $C_1$, conductor 92d, active element 23d, conductors 72d and 96 through switch pole $F_1$, conductors 98 and 72c and thence through active element 23c to conductor 92c; this circuit continues through the next arm from conductor 92c through passive element 25c, conductor 74c (which extends to fixed contact 3 of switch pole $B_2$) and thence through conductor 100 to switch pole $F_2$, conductor 102, to conductor 74b and then through passive element 25b, conductor 92b, conductor 104, through switch pole $C_2$, and conductor 66 to input terminal $b$. The other pair of conjugate arms of the bridge, connected across the input terminals $c$ and $b$, extend from terminal $c$ through conductor 60, switch pole $C_1$, conductor 92d, passive element 25d, conductor 74d (which extends to fixed contact 4 of switch pole $B_2$) and thence through conductor 104, switch pole $E_2$, conductors 106 and 74a, and through passive element 25a; this circuit is completed through active element 23a, conductors 72a and 108, switch pole $E_1$, conductors 110 and 72b, through active element 23b, conductors 92b and 104, switch pole $C_2$ and conductor 66 to input terminal $b$.

For initially balancing the total load bridge circuit just described, the balancing circuit 54 has its upper terminal connected through conductor 114, switch pole $C_1$, and conductor 60 to the input terminal $c$; its lower terminal is connected through conductor 116, switch pole $A_2$ and conductors 78 and 66 to input terminal $b$; and its other terminal is connected through conductor 118, switch pole $D_2$ and conductor 80 to the output terminal $d$. The signal voltage from the bridge circuit for measuring total load is developed across output terminals $a$ and $d$. For this purpose the output terminal $a$ is connected through conductor 94, switch pole $A_1$ and conductors 112 and 92a to the junction of the active element 23a and passive element 25a. The output terminal $d$ is connected through conductor 80, switch pole $D_1$, conductors 120 and 92c and thence to the junction of active element 23c and passive element 25c.

In order to supply an excitation voltage to the input terminals $c$ and $b$ of the transducer unit just described, these terminals are connected through cable 30 to the output terminals $b'$ and $c'$ of a receptacle 122 on indicator unit 28. Similarly, to apply the signal voltage from the output terminals $a$ and $d$ to the indicator unit these terminals are connected through cable 30 to the input terminals $a'$ and $d'$ of receptacle 122.

The circuitry of the indicator unit 28 will be described with reference to Figure 6. The power supply 48 comprises a transformer 124 having its primary winding energized through an on-off switch 125 from a suitable power source such as the standard commercial supply of 117 volts at 60 cycles frequency. The on-off condition of the power supply is indicated by a pilot lamp 126 connected across one secondary winding of the transformer 124. The other secondary winding of the transformer 124 is connected across a full wave rectifier tube 127, the output voltage of which is supplied through a filter 128 and voltage regulator, including a gas tube 130, to oscillator 38. The oscillator 38 suitably comprises a pentode tube 131 connected in a tuned plate circuit for developing an output voltage of 1000 cycles, for example. The oscillator output voltage is applied through coupling transformer 132 to the output terminals b' and c' of receptacle 122 which, as previously described, are connected with the transducer unit for supplying an excitation voltage thereto. The output terminal c' and the input terminal a' are connected together by a resistor and a calibrate switch 133.

In the indicator unit 28, the amplifier 40, memory circuit 44 and meter circuit 46 are energized from the power supply 48. For this purpose the rectified and filtered supply voltage from filter 128 is applied through a voltage regulator, including a gas tube 134, to the plate circuits of these stages. The signal voltage taken from input terminals a' and d' is applied through a coupling transformer 136 to an attenuator 138 having an adjustable control element 140 on the front panel of indicator unit 28. From the attenuator the signal voltage is applied to the amplifier 40 including a pair of cascade voltage amplifier stages 142 and 144 which drive a cathode follower amplifier stage 146. In the amplifier 40 a degenerative feedback path 148 is connected from amplifier stage 146 to the amplifier stage 142 to stabilize the amplifier. This feedback path includes a potentiometer having a control element 150 on the front panel of the indicator unit 28 for calibration of the unit by adjusting the amplifier gain. The amplified signal voltage from cathode follower stage 146 is coupled through a 1000 cycle filter 152, for removing spurious components, to the rectifier 154 and the time constant circuit 156 for extending the duration of the pulse of signal voltage. The signal voltage is thence applied to the cathode follower amplifier 158 preceding the memory circuit 44 to be described presently.

The memory circuit 44 provides selectively for sustained indication of the peak value of fast acting loads or the normal indication of slow acting or static loads. This circuit is connected across the output impedance of the cathode follower amplifier 158 and extends through a series rectifier or diode 160 to a function switch 162 and thence selectively through a storage condenser 164 or a resistor 166 and a potentiometer resistor 168. The function switch is disposed on the front panel of the indicator unit for manual selection of "hold" or sustained indication, "normal" indication, or "reset." In the "hold" position shown in the drawings the diode 160 is connected serially with the condenser 164 which is suitably a low-loss polystyrene condenser. The diode is poled to permit the condenser 164 to be charged by conduction of the diode in its forward direction in accordance with the signal voltage and to prevent discharge of the condenser by virtue of its high resistance in its backward direction. Hence the voltage across the condenser has a value corresponding to the peak value of the load being measured. This peak voltage, which is retained for an interval of several minutes before leakage current causes an appreciable change, is applied to the meter circuit 46. When the function switch is displaced downwardly to the "reset" position, the condenser is allowed to discharge through the potentiometer resistor 168 and the input voltage to the meter circuit is reduced to zero. When the function switch is displaced upwardly to the "normal" position, the signal voltage is developed across resistor 166 and applied to the meter circuit. The meter circuit 46 is a conventional differential cathode follower with a dual triode tube 170 having input terminals between grid and cathode of one triode section and a balancing potentiometer 172 between the grid and cathode of the other triode section. The indicating meter 174 is suitably a moving coil instrument connected across the cathodes of tube 170 and providing a meter deflection corresponding to the value of the input voltage applied to the first triode section.

In operation of the measuring apparatus, the transducer unit 26 is installed on the desired press and the sensing arms 24a, 24b, 24c, and 24d are mounted on the selected load carrying members. For initial adjustment, the indicating unit 28 is connected with the transducer unit through the cable 30, and with the function switch 162 in the "normal" position and the attenuator switch 140 in the "off" position, the power switch 125 is turned on. The indicating meter 174 is then zeroed by adjustment of the balancing potentiometer 172. Next the various bridge circuits are balanced by setting the selector switch 56 to the desired inputs successively, starting with position 1, for example. With the attenuator switch 140 set in the highest attenuation position, the balancing elements $R_a$, $C_a$, and $r_a$ are adjusted until the meter reads zero and this is repeated for each successively lower position of the attenuator switch 140. This procedure is repeated for each position of the selector switch 56 for the corresponding balancing elements. Calibration is effected by closing the calibrate switch 133 to apply the excitation voltage from oscillator 38 to the meter circuit 46, through the intermediate circuit stages, and by adjusting the potentiometer control element 150 to obtain the appropriate meter deflection.

The transducer unit 26 is now ready for use and the adjustment procedure need not be repeated except to compensate for changes in the press structure. The portable indicating unit 28 may be disconnected and used with other transducer units. The load on any selected individual member or the total load on plural members may be measured by simply setting the selector switch 56 to the desired position. The indicating meter may be suitably calibrated in units of strain or in units of load as desired.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

We claim:
1. In combination with a press of the type having plural load-carrying members, a load transducer unit mounted on the press, said unit including plural pairs of bridge circuit sensing arms each including a strain gage element mounted respectively on plural selected load-carrying members of the press, a common pair of bridge circuit dummy arms adapted for connection with each of said sensing arms for forming a bridge circuit, a different balancing circuit for balancing each bridge circuit with no load on the respective load carrying member, selector switching means interconnecting said pair of dummy arms with a selected pair of sensing arms and with the associated balancing circuit to form one bridge circuit at a time for developing a signal voltage corresponding to the load on the respective member, and a separate load indicating unit comprising a power supply, an oscillator energized from said power supply for developing an excitation voltage and having output terminals adapted for connection across one diagonal of the bridge circuit through the switching means, a meter circuit having input terminals adapted for connection across the other diagonal of the bridge circuit through the switching means and including a meter for indicating load, whereby the load on a selected member may be measured for any operating condition of the press.

2. In combination with a press of the type having plural load-carrying members, a load transducer unit having a pair of input and a pair of output terminals and being mounted on the press, said unit including plural pairs of bridge circuit sensing arms each including a strain gage element mounted respectively on plural selected load-carrying members of the press, a common pair of bridge circuit dummy arms adapted for connection with each of said sensing arms for forming a bridge circuit, a different balancing circuit for each bridge circuit and including adjustable impedances for balancing each bridge circuit with no load on the respective load carrying member, selector switching means interconnecting said pair of dummy arms with a selected pair of sensing arms and with the associated balancing circuit to form one bridge circuit at a time for developing a signal voltage corresponding to the load on the respective member, said input terminals being connected through said switching means across one diagonal of the bridge circuit and said output terminals being connected through the switching means across the other diagonal of the bridge circuit, and a separate load indicating unit having a pair of input terminals and a pair of output terminals, said indicating unit comprising a power supply, an oscillator energized from said power supply for developing an excitation voltage and being connected with the indicator unit output terminals, a meter circuit including amplifiers energized from the power supply, the meter circuit having its input terminals connected with the input terminals of the indicating unit and including a meter for indicating load, and means for detachably connecting the indicating unit output terminals to the transducer unit input terminals for supplying said excitation voltage to said bridge circuit and the transducer unit output terminals to the indicator unit input terminals for supplying said signal voltage to the meter circuit, whereby the load on a selected member may be measured for any operating condition of the press.

3. In combination with a press of the type having plural load-carrying members, a load transducer unit mounted on the press, said unit including plural pairs of bridge circuit sensing arms each including a resistance strain gage element mounted respectively on plural selected load-carrying members of the press, a common pair of bridge circuit dummy arms including resistance elements adapted for connection with each of said sensing arms for forming a bridge circuit, a different balancing circuit for balancing each bridge circuit with no load on the respective load carrying member, selector switching means interconnecting said pair of dummy arms with a selected pair of sensing arms and with the associated balancing circuit to form one bridge circuit at a time for developing a signal voltage corresponding to the load on the respective member, and a separate load indicating unit comprising a power supply, an oscillator energized from said power supply for developing an excitation voltage and having output terminals adapted for connection across one diagonal of the bridge circuit through the switching means, a meter circuit having input terminals adapted for connection across the other diagonal of the bridge circuit through the switching means, said meter circuit including amplifying means for the signal voltage and a memory circuit including a storage condenser and a resistor connected across the amplifying means through rectifying means and a manual switch for selectively connecting either the condenser or resistor to the rectifying means, and an indicating meter effectively connected across said manual switch and said condenser and resistor whereby either a sustained or a normal indication of the load, depending upon the position of said manual switch, in a selected member of the press is presented by said meter.

4. In combination with a press of the type having plural load-carrying members, a load transducer unit having a pair of input and a pair of output terminals and being mounted on the press, said unit including plural pairs of bridge circuit sensing arms each including a strain gage element mounted respectively on plural selected load-carrying members of the press, a common pair of bridge circuit dummy arms, a multi-pole selector switch having a portion adapted for connection of each of said sensing arms with said dummy arms for forming an individual load responsive bridge circuit, and having a portion adapted for connection of selected sensing arms in opposite arms for forming a total load responsive bridge circuit, a different balancing circuit for each bridge circuit and including adjustable impedances for balancing each bridge circuit with no load on the respective load carrying member, said selector switch also having a portion adapted for connection of each balancing circuit with its respective bridge circuit for developing a signal voltage corresponding to the load on the respective members, said input terminals being connected through said switching means across one diagonal of the bridge circuit and said output terminals being connected through the switching means across the other diagonal of the bridge circuit, and a separate load indicating unit having a pair of input terminals and a pair of output terminals, said indicating unit comprising a power supply, an oscillator energized from said power supply for developing an excitation voltage and being connected with the indicator unit output terminals, a meter circuit including vacuum tube amplifiers energized from the power supply, the meter circuit having its input terminals connected with the input terminals of the indicating unit and including a meter for indicating load, and means for detachably connecting the indicating unit output terminals to the transducer unit input terminals for supplying said excitation voltage to said bridge circuit and the transducer unit output terminals to the indicator unit input terminals for supplying said signal voltage to the meter circuit, whereby the load on a selected individual member or the total load on selected plural members may be measured for any operating condition of the press.

5. In combination with a press of the type having plural load-carrying members, a load transducer unit having a pair of input and a pair of output terminals and being mounted on the press, said unit including plural pairs of bridge circuit sensing arms including active and passive resistance strain gages mounted respectively on plural selected load-carrying members of the press, a common pair of bridge circuit dummy arms including resistance elements adapted for connection with each of said sensing arms for forming a bridge circuit, a different balancing circuit for each bridge circuit and including adjustable impedances for balancing each bridge circuit with no load on the respective load carrying member, a multiple pole selector switch with each pole having a movable and plural fixed contacts, a first pair of poles with their movable contacts connected across the transducer unit input terminals and their plural fixed contacts connected with the end terminals of the common dummy arms, a second pair of poles with their movable contacts connected across the opposite terminals of said common dummy arms and their corresponding pairs of fixed contacts connected across the end terminals of corresponding sensing arms, a third pair of poles with their movable contacts connected respectively to one of the transducer unit input and output terminals and their corresponding pairs of fixed contacts connected across two terminals of corresponding balancing circuits, a third terminal on each balancing circuit being connected to the plural fixed contacts of one of the first pair of poles, a fourth pair of poles with their movable contacts connected across the transducer unit output terminals and their corresponding pairs of fixed contacts connected respectively to the intermediate terminals of said sensing arms and said dummy arms, and a separate load indicating unit having a pair of input terminals and a pair of output terminals, said indicating unit comprising a power supply, an oscillator energized from said power supply for developing an excitation voltage and being connected with the indicator unit output terminals, a meter circuit including vacuum tube amplifiers energized from the power supply, the meter circuit having its input terminals connected with the input terminals of the indicating unit and including a meter for indicating load, and means for detachably connecting the indicating unit output terminals to the transducer unit input terminals for supplying said excitation voltage to said bridge circuit and the transducer unit output terminals to the indicator unit input terminals for supplying said signal voltage to the meter circuit, whereby the load in a selected member may be measured in any operating condition of the press.

6. The combination of claim 4 wherein said selector switch comprises a multiple pole switch with each pole having a movable and plural fixed contacts, a first pair of poles with their movable contact connected across the transducer unit input terminals and their plural fixed contacts connected with the end terminals of the common dummy arms, a second pair of poles with their movable contacts connected across the opposite terminals of said common dummy arms and their corresponding pairs of fixed contacts connected across the end terminals of corresponding sensing arms, a third pair of poles with their movable contacts connected respectively to one of the transducer unit input and output terminals and their corresponding pairs of fixed contacts connected across two terminals of corresponding balancing circuits, a third terminal on each balancing circuit being connected to the plural fixed contacts of one of the first pair of poles, a fourth pair of poles with their movable contacts connected across the transducer unit output terminals and their corresponding pairs of fixed contacts connected respectively to the intermediate terminals of said sensing arms and said dummy arms, an additional fixed contact on all of said poles, a fifth and sixth pair of poles, each pole having a movable contact and a fixed contact corresponding in position to said additional fixed contacts all connected in series with selected sensing arms, an additional balancing circuit having three terminals, the additional contact on one pole of each of said first, third and fourth pairs of poles connected respectively to the three terminals of the balancing circuit, the additional fixed contacts on the first pair of poles being connected across the transducer unit input terminals and the additional fixed contacts on the fourth pair of poles being connected across the transducer unit output terminals whereby signal voltages may be derived corresponding to the load on an individual member when the selector switch is positioned to engage one of the said plural fixed contacts and corresponding to the total load on plural members when the selector switch is positioned to engage said additional fixed contacts.

References Cited in the file of this patent

UNITED STATES PATENTS

| | | |
|---|---|---|
| 2,547,926 | Cook | Apr. 10, 1951 |
| 2,675,701 | Bidwell | Apr. 20, 1954 |

OTHER REFERENCES

Publication: Instrument Practice "100 Channel Static Strain Recorder," by Allwood, January 1957, pages 34–40.